C. C. BROWN.
CHEESE CABINET.
APPLICATION FILED FEB. 27, 1907.
No. 899,945.
Patented Sept. 29, 1908.
2 SHEETS—SHEET 1.
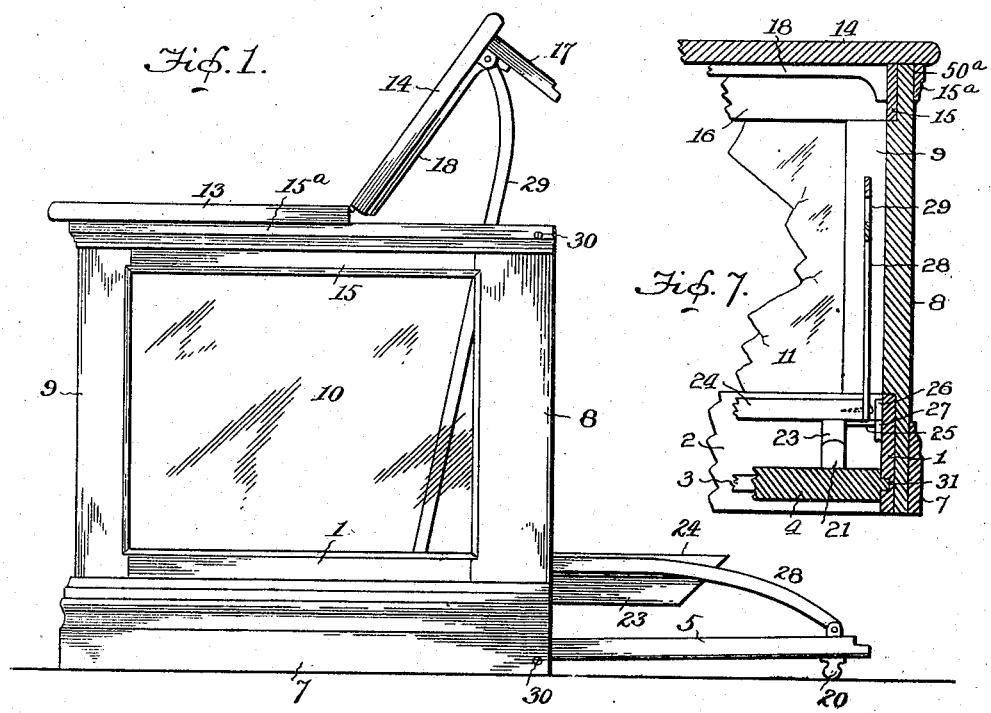
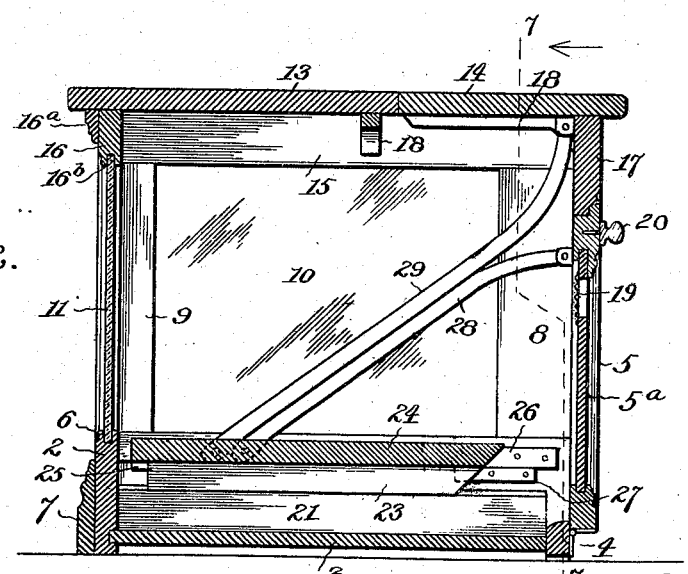
Witnesses:
C. F. Duvall.
N. S. Beall.
Charles C. Brown,
Inventor,
by W. S. Duvall,
Attorney.

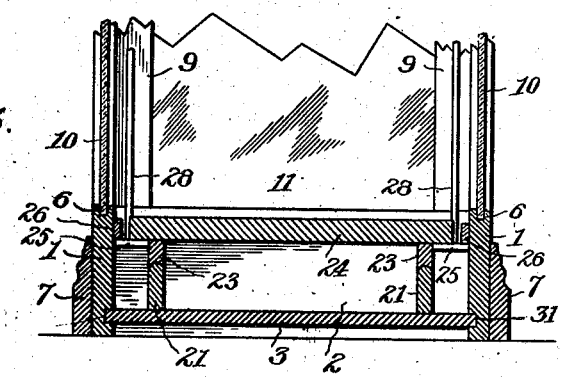
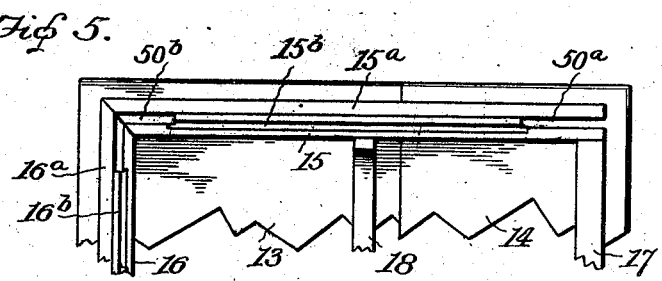
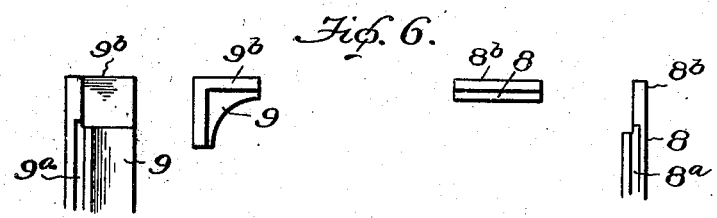
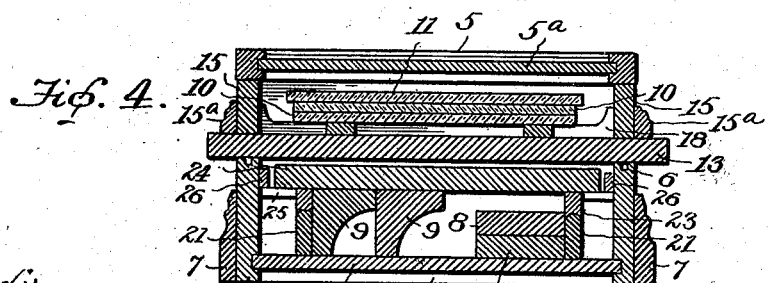

UNITED STATES PATENT OFFICE.

CHARLES C. BROWN, OF CHAMBERSBURG, PENNSYLVANIA.

CHEESE-CABINET.

No. 899,945.

Specification of Letters Patent.　　Patented Sept. 29, 1908.

Application filed February 27, 1907.　Serial No. 359,638.

*To all whom it may concern:*

Be it known that I, CHARLES C. BROWN, a citizen of the United States, residing at Chambersburg, in the county of Franklin and State of Pennsylvania, have invented certain Improvements in Cheese-Cabinets, of which the following is a specification.

This invention is an improvement in cabinets, and relates more especially to the class of cheese cabinets of that type which are provided with a slidable table or support for the cheese cutting device, whereby the latter may be moved partly out of the cabinet for convenience of operation.

One of the objects of the invention is to provide a construction of cheese cabinet which will permit of the parts thereof being separated or knocked down and arranged in compact form for convenience and economy in shipping, and in which the operation of assembling the parts to cabinet form may be readily accomplished by an unskilled person.

A further object of the invention is to provide a peculiar construction and arrangement which will facilitate the operation of opening the cabinet to expose the cheese for the purpose of cutting the same, and in which such operative parts may be easily kept clean.

Other, though minor, objects of the invention will hereinafter appear, and what I claim as novel in my improved form of cheese cabinet will be hereinafter specifically set forth in the appended claims.

In the accompanying drawings, which form a part of this specification:—Figure 1 is a side elevation of a cheese cabinet constructed in accordance with my invention, the door being opened or lowered, in which position the slidable cheese support is moved forward and the hinged section of the top elevated to expose the cheese for cutting. Fig. 2 is a vertical longitudinal sectional view through the cabinet, the same being in its closed position. Fig. 3 is a detail transverse section view through the lower part or base portion of the cabinet. Fig. 4 is a view showing the parts knocked down and arranged for shipment. Figs. 5 and 6 are details hereinafter referred to. Fig. 7 is a sectional view on the line 7—7 of Fig. 2.

Like numerals of reference indicate like parts in all the views of the drawings.

In carrying out my invention the bottom portion or base of the cabinet is made up of the side pieces 1, the end piece 2, the stationary bottom 3, and the removable sill-piece 4, to which latter the door 5 is hinged, as shown. The upper edges of the parts 1 and 2 are grooved for a part of their length, as at 6, to receive the glass panels, and said parts are also reinforced at their outer sides by molding strips 7, which latter serve also as an ornamental finish for this part of the cabinet.

At the front end of the cabinet rise vertical corner posts 8, and at the rear end are corner posts 9, the latter being angular in cross-section, and said corner posts 8 and 9 are provided with means, hereinafter described, by which they detachably engage the top and bottom portions of the cabinet. The angular corner-posts 9 are grooved at their vertical edges for a portion of their length, as at 9ª, to receive an edge of the side panels 10 and the back panel 11, said panels 10 and 11 being preferably of glass, as indicated in the drawings. One edge of each corner-post 8 is also grooved for a portion of its length, as at 8ª, to receive the front edge of the side panels 10.

The top of the cabinet comprises a top piece made in two parts or sections 13 and 14, hinged together so that one of said sections, as 13, may form the stationary part of the top and the other section, as 14, may swing upward to further expose the cheese when the cabinet is open. The section 13 of the top is provided with depending side pieces 15 and end piece 16, the side pieces extending forwardly, as shown, to form a rest for the swinging top section 14, and the latter is provided at its forward end with a depending board 17 which forms a part of the front of the cabinet. The parts 13 and 14 of the top are reinforced or braced by suitable battens 18 secured to the underside thereof, the battens for the stationary top-section 13 being secured at its ends to the depending side pieces 15 of the top to form braces therefor, while the battens on the swinging top section 14 form braces for the depending front board 17. The depending side and end pieces 15 and 16 of the top are finished with molding strips 15ª and 16ª, respectively, which are attached thereto, said side and end pieces being rabbeted at their opposite ends, said rabbeted portions, in connection with said molding strips, forming sockets, as 50ª and 50ᵇ, to receive the corner posts 8 and 9, respectively, the corresponding side and end pieces 1 and 2 of the base portion of the cabinet being also rabbeted in exactly the same manner to form similar sockets. The ends of the posts 8 and 9 are tenoned, as at 8ᵇ and 9ᵇ, respectively, (Fig. 6), so that they will fit in the sockets of the top and bottom, and so that smooth joints will be presented at all the corners of the cabinet. As the glass panels 10 and 11 also engage the depending side and end pieces 15 and 16 of the top, these pieces are provided at their lower edges, for a portion of their length, with grooves 15ᵇ and 16ᵇ, respectively, which receive said panels.

The door 5 of the cabinet comprises an ordinary rectangular frame in which is secured a panel 5ª, of wood or other material, and said panel is provided at its upper end with a narrow horizontal opening which is covered by wire gauze 19, said gauze covered opening serving as a ventilator for the cabinet. The door is hinged at its lower end to the sill-piece 4, as hereinbefore stated, so that it will be removable therewith, and for convenience in opening and closing the door it is provided with a knob 20.

Mounted upon the bottom board 3, and disposed longitudinally, is a pair of rails 21, secured to said bottom board and to the end piece 2 of the base portion of the cabinet, the upper edges of said rails being rounded transversely and fit in corresponding recesses along the lower edge of a pair of similarly disposed rails 23 secured to the underside of a table or supporting-board 24, whereby said table or support is slidably mounted. This support or table is adapted to move partly out of the cabinet when the door 5 is open, and in order to limit its forward movement, as well as keep it upon its rails 21, said slidable table or support is provided with opposite guides 25 at its rear end which slidably engage the underside of a guide-rail 26, one at each side of the cabinet, the said guides being adapted to abut against stop-blocks 27 which serve to limit the forward movement of said table or supporting-board 24.

In order to automatically move the table or supporting-board 24 forward when the door 5 is lowered, I provide a curved rod 28, which is pivoted at one end to the rear part of the slidable table, at the side edge thereof (see dotted lines, Fig. 2), and at its other end pivoted to the upper part of the door, whereby when the door is opened and swung down the said rod will draw the table forward, and when the door is closed said draw-rod 28 will also serve to move said table back into the cabinet. And so that this operation will also operate the swinging section of the top of the cabinet, said swinging section is connected by a rod 29 to the slidable table or supporting-board, being pivoted at its lower end adjacent the pivot connection of the rod 28 so that the rods 28 and 29 will come together when the cabinet is closed. It will be noted that a pair of these rods is located at each side of the sliding board or table, as shown in the drawings.

It will be noted that in the construction of the top and bottom portions of the cabinet, and by reason of the rabbets at the ends of the side and end pieces of the same, in conjunction with the overlapping molding strips, sockets are formed which receive the tenoned ends of the corner-posts, so that in assembling these parts it is only necessary to step the corner posts into the sockets of the bottom portion or base of the cabinet, and then place the top on said posts so that the tenoned ends of the latter will engage the sockets in said top, the glass panels being slipped in place between the posts before the top is applied. The weight of the top, in conjunction with the glass panels, will, therefore, hold the parts of the cabinet together; but as the sockets 50ª which receive the tenoned ends of the front posts open out forwardly (see Fig. 5) these posts are connected at top and bottom by ordinary wood-screws 30. As will be seen, therefore, only four screws are necessary to secure the cabinet; but in some instances I may use four additional screws for the top and bottom of the rear corner-posts.

In order that the sill piece 4 which carries the door may be removable with said door, and therefore obviate the necessity of unhinging said door, the ends of said sill-piece are tenoned (see Fig. 7) to fit in recesses 31 at the inner side of the side pieces 1 and opening out at the front end thereof, said sill-piece being secured in place by the screws 30 which are let into the lower part of the cabinet through the molding 7, post 8 and side piece 1. The recesses 31 are continuations of the recesses or grooves which receive the bottom board 3 (see Fig. 3).

In knocking down the cabinet the screws at the top are first removed, and then the top is lifted from the corner-posts and the operating rods for the slidable table disconnected. The glass panels are now slid out in an upward direction, the screws at the bottom removed, and after disconnecting the posts from the sockets in the base the sill-piece and door are removed. In packing the parts for shipping the glass panels are placed within the top, the door is placed over the panels and fastened with wooden blocks. The top carrying these parts is then placed directly upon the bottom or base section, and the posts placed in the space between the slidable table and bottom board. Of course the posts and other parts may be suitably protected against rubbing by wrapping them with burlap. When the parts are packed in this manner they will occupy comparatively little space and will be better protected when boxed or crated for shipment.

The operation of assembling the parts in cabinet form is very simple, as above explained, and can be accomplished by an unskilled person with very little explanation.

The particular construction of the table and its guides and slides provides that these parts may be easily kept clean, the rounded upper edge of the lower slides preventing the accumulation of particles of cheese thereon.

Having thus described my invention, what I claim as new and desire to secure by Letters-Patent, is:—

1. In a knockdown cheese-cabinet, the combination, of a bottom section having post sockets at the corners thereof and open-end recesses at the forward end of said bottom section, corner posts removably engaging the sockets and having grooves at their edges, side and end panels removably engaging the grooves in the corner-posts, a top section having sockets to receive the corner posts, a door for the front of the cabinet, a sill-piece hinged to the door and at its ends adapted to removably engage the open-end recesses in the bottom section, and screws connecting the top and bottom sections to the front corner-posts, the lower screws passing into the sill-piece, substantially as shown and for the purpose set forth.

2. In a knockdown cheese cabinet, the combination, of a bottom section having post-sockets at its corners and open-end recesses at the front end thereof, corner-posts tenoned to removably engage the sockets and having grooves at their edges, side and end panels removably engaging the grooves in the corner-posts, a top section having sockets to receive the upper tenoned ends of the corner-posts, a door for the front of the cabinet, a sill-piece hinged to the door and at its ends adapted to removably engage the open-end recesses in the bottom section, and means for securing the front posts to the top and bottom sections and to the sill-piece; together with a table or supporting board slidably mounted on the bottom of the cabinet, and rods connecting said supporting-board to the hinged door, substantially as shown and described.

3. In a knockdown cheese cabinet, the combination, of a bottom section having post sockets at its corners and open-end recesses at the front end thereof, corner-posts tenoned to removably engage the sockets and having grooves at their edges, side and end panels removably engaging the grooves in the corner-posts, a top comprising a stationary section and a swinging section hinged thereto, the stationary section having post-sockets to receive the upper tenoned ends of the corner-posts, a door for the front of the cabinet, a sill-piece hinged to the door and at its ends adapted to removably engage the open-end recesses in the bottom section, and means for securing the front posts to the top and bottom sections and to the sill-piece; together with a table or supporting-board slidably mounted on the bottom of the cabinet, and rods connecting said board to the swinging door and hinged top section.

4. In a knockdown cheese-cabinet, the combination, of a bottom section comprising a bottom board, sides and an end, the side and end pieces being rabbeted at their ends and having molding strips which overlie the rabbets and form sockets, a top comprising side and end pieces rabbeted at their ends and having molding strips overlying the rabbets to provide sockets, corner-posts the ends of which are tenoned to removably engage the sockets in the top and bottom sections, panels located between the corner-posts and removably engaging the same, and a door hinged to the front of the cabinet, substantially as shown and described.

5. In a knockdown cheese-cabinet, the combination, of a bottom section comprising a bottom board, sides and a rear end, the side and end pieces being rabbeted at their ends and having molding strips which overlie the rabbets to form sockets and the side pieces provided with open-end recesses at their forward ends, a top comprising side and end pieces rabbeted at their ends and having molding strips overlying the rabbets to provide sockets, corner-posts the ends of which are tenoned to engage the sockets in the top and bottom sections, said posts being grooved at the edges, and panels removably engaging the grooves in the corner-posts; together with a door for the front of the cabinet, a sill-piece hinged to the door and adapted to engage the aforesaid open-end recesses in the bottom-section, and means for securing the corner posts to the top and bottom sections and to the sill-piece.

6. In a knockdown cheese-cabinet, the combination, of a bottom section comprising a bottom board, sides, and a rear end, the side and end pieces being rabbeted at their ends and having molding strips which overlie the rabbets to form sockets and the side pieces provided with open-end recesses at their front ends, a top comprising two sections hinged together, one of said sections having depending side and end pieces rabbeted at their ends and provided with molding strips which overlie the rabbets to form sockets, corner-posts the end of which are tenoned to engage the sockets in the bottom and top sections, panels slidably engaging the posts, a door for the front of the cabinet, and a sill hinged to the door and adapted at its ends to engage the aforesaid open-end recesses in the bottom section, the parts being secured at the corners by screws passing through the joints; together with a table or supporting-board slidably mounted in the bottom of the cabinet, and rods connected to said board and to the door and hinged section of the top.

In testimony whereof I have signed my name to this specification in the presence of two subscribing witnesses.

CHARLES C. BROWN.

Witnesses:
H. G. SHADE,
H. W. GLADHILL.